United States Patent
Koppmann et al.

(10) Patent No.: US 9,559,525 B2
(45) Date of Patent: Jan. 31, 2017

(54) NETWORK MONITORING DEVICE

(75) Inventors: Bardo Koppmann, Kaltenbrunn (DE); Andreas Krätzschmar, Ammerthal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 409 days.

(21) Appl. No.: 14/241,747

(22) PCT Filed: Aug. 7, 2012

(86) PCT No.: PCT/EP2012/065446
§ 371 (c)(1),
(2), (4) Date: Apr. 3, 2014

(87) PCT Pub. No.: WO2013/029938
PCT Pub. Date: Mar. 7, 2013

(65) Prior Publication Data
US 2014/0214232 A1    Jul. 31, 2014

(30) Foreign Application Priority Data

Aug. 30, 2011 (DE) .................. 10 2011 081 766

(51) Int. Cl.
*G06F 19/00* (2011.01)
*H02J 4/00* (2006.01)
(Continued)

(52) U.S. Cl.
CPC .. *H02J 4/00* (2013.01); *H02J 3/14* (2013.01); *H02J 13/0062* (2013.01);
(Continued)

(58) Field of Classification Search
USPC ........................................... 700/297
See application file for complete search history.

(56) References Cited

U.S. PATENT DOCUMENTS 3,858,110 A    12/1974  Breitmeier
4,469,998 A *   9/1984  Nola .................. H02P 23/26
                                                318/729
(Continued)

FOREIGN PATENT DOCUMENTS

CN    101630840 A    1/2010
DE    102010043752 A1    5/2012
(Continued)

OTHER PUBLICATIONS

Chinese Office Action and English translation thereof dated Oct. 21, 2015.
(Continued)

*Primary Examiner* — Kidest Bahta
(74) *Attorney, Agent, or Firm* — Harness, Dickey & Pierce, P.L.C.

(57) ABSTRACT

A network monitoring device for a supply network and a method for actuating a switch unit are disclosed, wherein the switch unit can control the energy supply of a consumer connected to a supply network. In order to prevent an overload of the supply network or of parts thereof, according to an embodiment of the invention, the network monitoring device includes a communication device, wherein the network monitoring device can receive a switch command for a switch unit via the communication device and transmit same to the switch unit, wherein the network monitoring device is designed to determine a network utilization of the supply network by way of a measurement device and, in dependence on the determined network utilization,; to influence a received switch command for the switch unit, which would lead to increased energy consumption on the supply network.

18 Claims, 2 Drawing Sheets

(51) Int. Cl.
*H02J 3/14* (2006.01)
*H02J 13/00* (2006.01)
*H04B 3/54* (2006.01)

(52) U.S. Cl.
CPC ........ *H04B 3/548* (2013.01); *H02J 2003/143* (2013.01); *H04B 2203/5458* (2013.01); *Y02B 90/2638* (2013.01); *Y02B 90/2692* (2013.01); *Y04S 40/124* (2013.01); *Y04S 40/146* (2013.01)

(56) References Cited

U.S. PATENT DOCUMENTS

| | | | |
|---|---|---|---|
| 4,644,320 A * | 2/1987 | Carr ................... | H02J 13/0006 340/12.37 |
| 6,163,129 A * | 12/2000 | Younger .................. | H02P 1/26 318/798 |
| 6,906,476 B1 * | 6/2005 | Beatenbough ......... | H05B 41/40 315/209 R |
| 7,042,176 B2 * | 5/2006 | Wobben ................ | B60L 3/0046 318/139 |
| 7,373,222 B1 | 5/2008 | Wright et al. | |
| 8,588,991 B1 * | 11/2013 | Forbes, Jr. ............. | G05B 19/02 700/286 |
| 8,598,836 B1 * | 12/2013 | Rabinovich ............... | H02P 1/28 318/771 |
| 8,849,471 B2 * | 9/2014 | Daniel ..................... | F03D 9/00 307/28 |
| 2003/0225483 A1 * | 12/2003 | Santinato ................ | H02J 3/008 700/295 |
| 2007/0096681 A1 * | 5/2007 | Bilac ........................ | H02P 1/26 318/729 |
| 2011/0040666 A1 | 2/2011 | Crabtree et al. | |
| 2012/0206273 A1 * | 8/2012 | Kim .......................... | H02J 3/14 340/870.02 |
| 2013/0304272 A1 | 11/2013 | Schaut et al. | |

FOREIGN PATENT DOCUMENTS

| | | |
|---|---|---|
| JP | 2007028769 A | 2/2007 |
| JP | 2009153336 A | 7/2009 |
| JP | 2010063320 A | 3/2010 |

OTHER PUBLICATIONS

German Office Action for German Application 10 2011 081 766.2 Dated Jun. 28, 2012.
International Search Report PCT/ISA/210 for International Application No. PCT/EP2012/065446 Dated Jun. 19, 2013.
Written Opinion of the International Searching Authority PCT/ISA/237 for International Application No. PCT/EP2012/065446.
International Preliminary Report on Patentability for International Application No. PCT/EP2012/065446 dated Sep. 3, 2013.

* cited by examiner

NETWORK MONITORING DEVICE

PRIORITY STATEMENT

This application is the national phase under 35 U.S.C. §371 of PCT International Application No. PCT/EP2012/065446 which has an International filing date of Aug. 7, 2012, which designated the United States of America, and which claims priority to German patent application number DE 102011081766.2 filed Aug. 30, 2011, the entire contents of each of which are hereby incorporated herein by reference.

FIELD

At least one embodiment of the invention relates to a network monitoring device for a supply network and a method for actuating a switch unit, which can control the energy supply of a consumer connected to a supply network.

BACKGROUND

When motors are connected to an electrical supply network, in particular with a direct start, but also with a star-delta start, significant starting currents occur. In the case of a direct start, these currents can be six to eight times the rated motor current and, in the case of star-delta start, 3.5-4.5-times the rated motor current. Twice the motor currents still occur with soft starters or frequency converters. However, even when other electrical consumers such as, for example, capacitors in compensation systems or lighting strips in factory buildings are connected, there is greatly increased power consumption for a brief period.

In addition to the size of these currents, the duration of such overloads is also of significance. With capacitive and resistive loads, these are typically from less than 10 to a maximum of 100 ms. In the case of motors, this time constant is much longer. In an ideal case, the start-up time can be less than 200 ms but it can also be up to a few 10 s (worst-case start-up time).

Both these core variables have a considerable influence on the load on the electrical supply network and on the network quality of the supply network (voltage dips). In particular in the case of the parallel connection of a plurality of (large) consumers, the feed-in power of the supply network can be too low. The voltage dips that occur then can result in faults in components or overloads.

Power supplies are therefore designed with certain simultaneity factors which are typically less than 80% of all consumers at rated load.

SUMMARY

At least one embodiment of the present invention is directed to preventing an overload of a supply network or of parts thereof. Preferably, the best possible network quality of the supply network should be guaranteed.

A network monitoring device is disclosed with a communication device, wherein the network monitoring device can receive a switch command for a switch unit via the communication device and transmit same to the switch unit, wherein the switch unit can control the energy supply of a consumer connected to a supply network, wherein the network monitoring device is designed to determine a network utilization of the supply network by way of a measurement device and, in dependence on the determined network utilization, to influence a received switch command for the switch unit which would lead to increased energy consumption on the supply network.

A method is also disclosed for actuating a switch unit which is able to control the energy supply of a consumer connected to a supply network, wherein a network monitoring device determines a network utilization of the supply network by way of a measurement device and, in dependence on the determined network utilization, influence a received switch command for the switch unit which would lead to increased energy consumption on the supply network.

Advantageous developments of the invention are disclosed in the dependent claims.

BRIEF DESCRIPTION OF THE DRAWINGS

The invention and embodiments of the invention will be described and explained in more detail below with reference to the example embodiments shown in the figures, in which.

DETAILED DESCRIPTION OF THE EXAMPLE EMBODIMENTS

Figure 1:
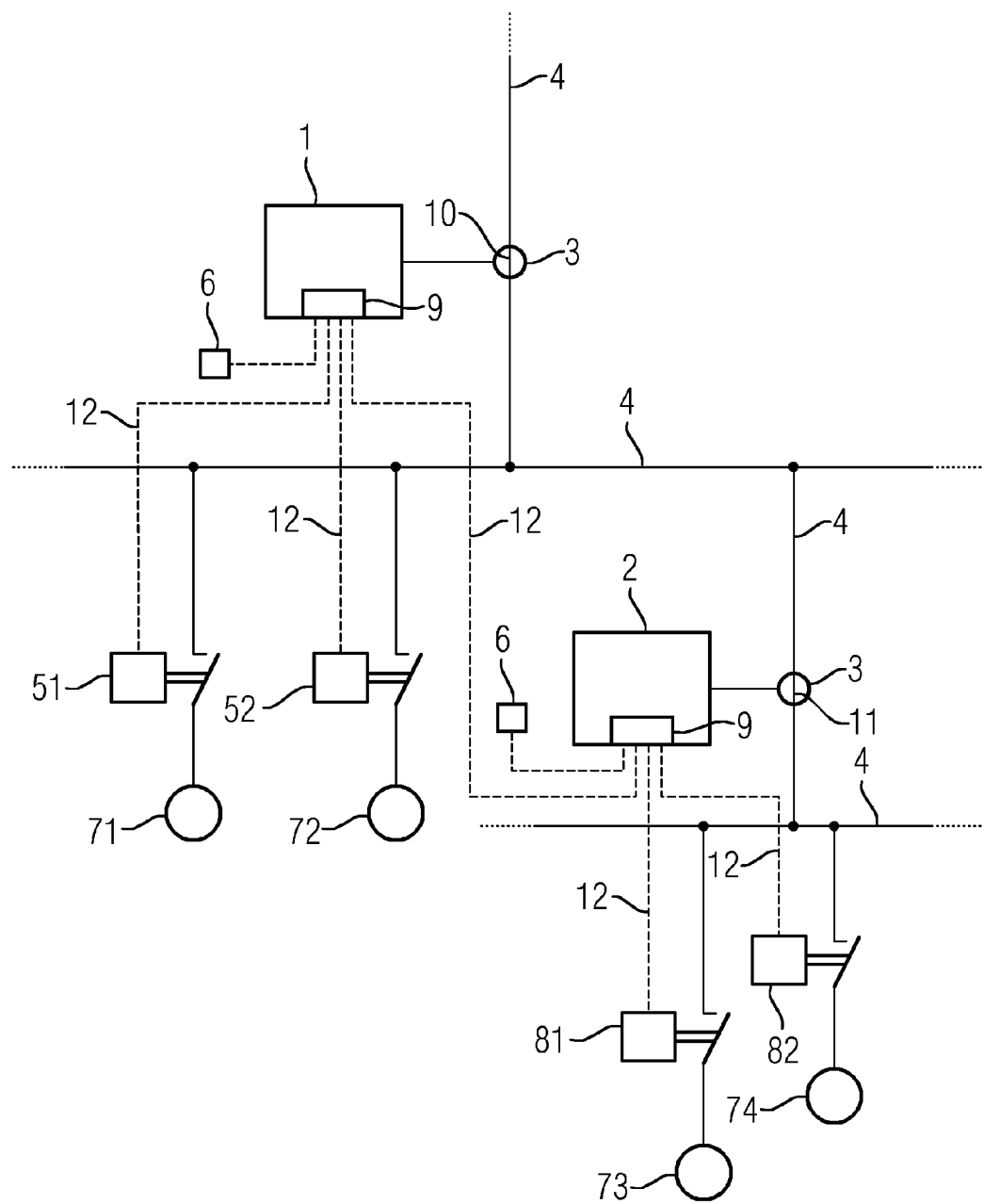
FIG. 1 shows the schematic structure of a supply system with a first and a second network monitoring device, wherein the network monitoring devices are connected to switch units by way of direct wiring

The logical concept on which at least one embodiment of the invention is based is in particular as follows:

- the network monitoring device monitors the network utilization of the supply network by determining the network utilization, preferably permanently, by way of the measurement device. The measurement device can be a component of the network monitoring device, but can also be a separate unit connected to the network monitoring device.
- the network monitoring device receives the switch command (for example ON or OFF command) for the switch unit controlling a consumer, for example from a higher-ranking control device. In this case, the network monitoring device receives the switch command directly from the higher-ranking control device for example, i.e. by way of the control voltage of the switch unit, or indirectly via a communication link between the network monitoring device and the higher-ranking control device.
- if, on the implementation of the switch command at the switch unit to be actuated, the received switch command leads to increased energy consumption on the supply network, the received switch command may be influenced by the network monitoring device in dependence on the determined network utilization of the supply network. In the case of normal network utilization (no increased network utilization) of the supply network, the received switch command is forwarded unchanged to the switch unit so that the switching action desired by the control device takes place at the switch unit. The consumer controlled by the switch unit is, for example, connected to the supply network. If, on the other hand, there is increased network utilization, the network monitoring device initiates suitable measures to ensure that no increased network utilization occurs on the supply network due to the switch command. The received switch command is in particular influenced by the network monitoring device. In this case, for example, the received switch command for the switch unit is rejected by the network monitoring device (i.e. it is not forwarded to the switch unit) so that there is no state change at the switch unit and consequently no increased energy consumption on the supply network. It is also conceivable that, for example, the output of the received switch command to the switch unit is delayed. The switch command is preferably only output to the switch unit when the implementation of the switch command at the switch unit will not cause increased network utilization on the supply network. Hence delaying the time of the actuation by the network monitoring device leads to a staggered loading of the supply network by the consumer actuated by the switch unit. The network monitoring device preferably then reports the status of the switch command (executed, delayed, not executed, etc.) back to the higher-ranking control device.

In the case of a switch command for a switch unit which would lead to increased energy consumption of a consumer, in dependence on the determined degree of utilization of the supply network (network utilization), in particular the following ranges of functions are conceivable for the network monitoring device:
a) with reference to the determined network utilization, the switch command for the switch unit either is or is not influenced by the network monitoring device. In particular, the switch command for the switch unit is released, delayed or rejected by the network monitoring device.
b) if the switch command is released or delayed, the expected additional network loading from running up, direct connection and/or permanent operation is taken into account,
c) the connection and disconnection commands are prioritized in dependence on the priority of the consumers and/or on the switching status of the consumers on the supply network.

For all 3 ranges of functions (a-c), the network monitoring device must at least know the maximum network load capacity for its network junction point (measuring point). For the ranges of functions b and/or c, further information on the consumers connected to the supply network is necessary (for example starting current, start time, rated operational current and/or importance of the consumer). This information is preferably stored in the network monitoring device. Preferably, such information can be entered directly into the network monitoring device or is provided by a higher-ranking control device (for example SPC), for example via a bus coupling, to the network monitoring device. Therefore, the energy consumption behavior of the consumers can be stored in the network monitoring device. Moreover, preferably, details are stored in the network monitoring device of which switch unit controls which consumer so that targeted actuation of the consumers and hence targeted control of the network utilization by the network monitoring device is possible.

The switch unit in a particular embodiment controls the energy supply of the consumer to be supplied with energy by the supply network so that the energy consumption within the supply network can be influenced by the switch unit. The switch unit is, for example, a contactor, a soft starter or a frequency converter. The switch unit is preferably arranged downstream of the measurement device of the network monitoring device.

Hence, the network monitoring device enables the targeted control of the energy consumption of a consumer via its switch unit in dependence on the network utilization of the supply network. In the case of increased network utilization of the supply network, the received switch command for the consumer is preferably influenced by the network monitoring device. In the case of normal network utilization, preferably the received switch command is not influenced and consequently released for the switch unit by the network monitoring device.

In an advantageous embodiment, it is possible by way of the network monitoring device to influence the respective switch commands for a plurality of switch units connected thereto in a targeted way in dependence on the network utilization. For example, it is possible for the switch units only to control the energy supply of one consumer. However, it is also conceivable for a plurality of consumers connected to the supply network to be controlled by way of a plurality of switch units. This can achieve optimized connection behavior of the consumers in the supply network and hence optimized network utilization of the supply network.

Since the network monitoring device is able to determine the current network utilization of the supply network by way of the measurement device, on connection of a consumer, it is preferably possible to monitor by way of a switch unit controlled via the network monitoring device whether this leads to an overload of the supply network or not. If the connection of the consumer to the supply network would lead to an overload, targeted countermeasures can be initiated by the network monitoring device. Preferably, the connection of the consumer to the supply network can be delayed (until an overload of the supply network due to the switching procedure can be excluded), the connection can be prevented or another consumer can be removed from the supply network by the network monitoring device before the connection of the consumer. Hence, the network monitoring device can, in dependence on the network utilization it has determined, initiate measures to prevent an overload of the current supply network.

The network monitoring device preferably distinguishes between normal network utilization and increased network utilization. In the case of increased network utilization, the network utilization is preferably greater than 70% of the specified permissible network load capacity of the supply network. Consequently, normal network utilization entails a range of less than 70% of the specified permissible network load capacity of the supply network.

In the case of increased network utilization, the network monitoring device would change and output a switch command (for example connection of the consumer) received at the switch unit controlling the consumer such that the output switch command does not effect an immediate connection of the consumer but there is a delayed connection of the consumer by way of the switch unit or the connection of the consumer does not take place. It is also conceivable that, in the case of increased network utilization, before a connection of the consumer to be controlled by the network monitoring device, a switch command is output to a switch unit controlling another consumer so that the other consumer first releases energy resources (it is, for example, switched off), before the first consumer is connected. Hence, there is initially a reduction the network utilization due to the targeted actuation of another switch unit by the network monitoring device before the switch unit to be switched by the network monitoring device is actuated. The actuation of the other switch unit in particular causes the network utilization to be lowered such that the subsequent implementation of the switch command for the switch unit to be actuated does not result in increased network utilization. This can, for example, also be achieved by the targeted disconnection of a plurality of consumers and hence by the targeted actuation of a plurality of other switch units by the network monitoring device. In the case of the targeted disconnection of consumers, in particular those consumers are disconnected whose availability is not essential for the user and/or the whole system. Hence, by way of a network monitoring device of this kind, a supply network can be monitored such that network overloads can be avoided when loads are connected to this supply network. Hence, monitoring of the network utilization can achieve improved network quality in the supply network. Moreover, targeted monitoring of the network utilization by the network monitoring device can achieve very high utilization of the power supply.

The received switch command preferably originates from a higher-ranking control device and is preferably transmitted by way of a bus connection between the control device and the network monitoring device from the control device to the network monitoring device. It is also conceivable for the control voltage for the switch unit to be transmitted from the control device as a switch command and for this control voltage for the switch unit to be influenced by the network monitoring device.

In a further advantageous embodiment of the invention, the switch unit can be directly controlled and/or the determined network utilization transmitted to the switch unit by way of the communication device. The network monitoring device can be connected to the switch unit via the communication device that a switch command can be output to the switch unit via this. In the case of the direct control of the switch unit, the network monitoring device can receive a switch command transmitted by a control device for the switch unit to the network monitoring device and forward this unchanged. However, in the case of increased network utilization, the network monitoring device can influence the received switch command output to the switch unit. It is also conceivable for the network monitoring device to output the determined network utilization to the switch unit so that this influences the switch command for the switch unit to be actuated.

In the case of the direct control of the switch unit, preferably, all essential electrical consumers in the supply network that can be influenced by the network monitoring device are stored in the network monitoring device (preferably also with their start-up characteristics). Moreover, the network monitoring device preferably knows which consumer the respective switch unit connected to the network monitoring device is controlling. The network monitoring device can hence decide by way of a logic unit, which has details of the present network utilization and characterizing consumption figures for the actuated consumer, whether or not, in view of the network utilization, a consumer to be switched at the supply network can be connected by way of the associated switch unit. In the case of normal network utilization, the consumer can be connected. Consequently, the received switch command can be forwarded unchanged to the switch unit to be switched so that the consumer is connected to the supply network. If, on the other hand, there is increased network utilization on the supply network, the logic unit of the network monitoring device can change (influence) the received switch command for the switch unit such that, for example, there is a delay in the connection procedure of the consumer to be connected, no connection of the consumer to be connected takes place and/or, before the connection of the consumer, another consumer is removed from the supply network by way of another switch unit controlled via the network monitoring device or the energy consumption of the consumer is reduced. It is also conceivable in the case of high utilization of the supply network that, by way of the network monitoring device, a plurality of consumers are removed in a targeted manner from the supply network by their switch units or that the energy consumption of these consumers is reduced. To this end, the network monitoring device would transmit a switch command to the affected switch units of the consumers.

In the case of the direct control of the switch unit, the switch command (connection/disconnection) for the switch unit to be controlled is output directly by the network monitoring device via its communication device to the switch unit to be controlled. From a technical viewpoint, here, there are in particular the following possibilities:

a) the network monitoring device "only" functions as "intermediate relay", i.e. an actuation signal from the higher-ranking control device arrives directly at the network monitoring device (received switch command). Depending on the network utilization, in the network monitoring device, this actuation signal is forwarded to the switch unit/consumer, delayed or suppressed.

b) the network monitoring device receives a control signal from the control device by way of a communication link between the control device and the network monitoring device (received switch command). Depending on the network utilization, the network monitoring device then sends an actuation signal (switch command) via its communication device to the switch unit. This means that the network monitoring device simultaneously performs the function of auxiliary contactors (conversion of logic signals into actuation signals with a certain actuation power of a few (about ten) watts).

c) the network monitoring device receives control signals from the control device by way of a communication link between the control device and the network monitoring device (received switch command). Depending on the network utilization, the network monitoring device then sends a control signal (switch command) via its communication device to the switch unit. The communication between the network monitoring device and the control device and the switch unit(s) is preferably performed by way of a bus connection. Consequently, only logic signals are processed.

Alternatively to the direct control of a switch unit connected to the network monitoring device, the network monitoring device can transmit the determined network utilization to the switch unit to be controlled or the switch units to be controlled. Since the network monitoring device is preferably connected to a plurality of switch units connected to the supply network, the transmission of the network utilization enables the switch units to actuate the consumers controlled by the switch unit in dependence on the network utilization of the supply network. In the case of increased network utilization, it is, for example, possible for dispensable consumers (for example, air conditioning in a factory building) to be removed automatically from the supply network by switch unit so that network utilization is reduced. If normal network utilization has returned, the consumers can be automatically reconnected to the supply network by their switch units. Preferably, in the case of critical network utilization of the supply network, dispensable consumers with high degrees of utilization are removed from the network. If, for example, the network monitoring device forwards a switch command from a control device unchanged to a switch unit and additionally outputs a signal characterizing increased network utilization to the switch unit, the switch unit can be parameterized by the user so that, in the case of increased network utilization, the switch command is completely ignored. Hence, there is no implementation of the switch command at the consumer of the switch unit so that the switch command from the higher-ranking control device was influenced by the network monitoring device.

In a further advantageous embodiment of the invention, the network monitoring device is designed to compare a value determined with the measurement device with a reference value stored in the network monitoring device so that the network utilization of the supply network can be determined. The reference value can, for example, be input by the user or transmitted by a bus coupling from a higher-ranking control device to the network monitoring device. The reference value preferably characterizes the threshold value between the normal network utilization and the increased network utilization of the supply network. Moreover, preferably, the reference value also indicates the maximum permissible network load capacity of the supply network. Hence, the reference value and the value determined by the measurement device can enable a conclusion to be drawn regarding the network utilization. Hence, in dependence on the determined network utilization, the received switch signal for the switch unit can be influenced by the network monitoring device.

The comparison of the determined value with the reference value enables the network utilization of the supply network to be divided into several categories, for example critical network utilization (>90% of the permissible specified network load capacity of the supply network), increased network utilization (for example 90 to 70% of the permissible specified network load capacity of the supply network) and normal network utilization (for example <70% of the permissible specified network load capacity of the supply network). Categories of this kind enable the targeted actuation of certain consumers on the supply network to take place. In the case of increased or critical network utilization of the supply network, for example, certain consumers are not connected or are connected with a time delay by the network monitoring device. It is also conceivable for certain consumers to be switched off in a targeted manner by the network monitoring device. The connection or disconnection of the consumers is performed via the switch units (for example contactors, soft starters, frequency converters), which are connected to the network monitoring device.

The network monitoring device enables the network utilization to be divided in particular into two but also into more categories. In dependence on the respective category (for example: critical network utilization, increased network utilization and normal network utilization), the influence exerted on the received switch command by the network monitoring device can take different forms so that a stable energy supply by way of the supply network can be guaranteed and in particular an overload is prevented.

During normal network utilization, the received switch command in particular corresponds to that transmitted by the network monitoring device to the switch unit. During critical or increased network utilization, the received switch command is in particular forwarded to the switch unit with a time delay (preferably until normal network utilization is present) so that this is influenced.

In a further advantageous embodiment of the invention, the network monitoring device is designed such that, on the presence of the switch command for the switch unit, a further switch unit connected to the network monitoring device can be actuated such that the energy consumption of a consumer on the supply network actuated by the further switch unit is reduced.

In a further advantageous embodiment of the invention, consumption figures for a plurality of consumers are stored in the network monitoring device. A logic unit of the network monitoring device can hence analyze the consumers connected to the supply network on the basis of the network utilization and the stored consumption figures with respect to whether an actuation of a consumer by way of its switch unit can lead to an overload of the supply network. Preferably, a stored consumption value for a consumer characterizes the energy consumption of the consumer during its starting procedure, running up and/or during permanent operation. Consequently, in the case of critical or increased network utilization of the supply network, the network monitoring device can perform targeted actuation of consumers to be supplied with energy via the supply network by way of the actuation of their switch units.

In a further advantageous embodiment of the invention, a programmable logic control (PLC) comprises a network monitoring device. Hence, the network monitoring device is integrated in a control (PLC) by which one or more switch units can be actuated.

In a further advantageous embodiment of the invention, a supply system comprises a supply network, at least one switch unit and a network monitoring device, wherein the network monitoring device can determine the network utilization at a first measuring point of the supply network by way of the measurement device and, in dependence on the determined network utilization, influence a switch command for the switch unit at the first measuring point, which would lead to increased energy consumption on the supply network.

In a further advantageous embodiment of the invention, the switch unit is arranged downstream of the first measuring point on the supply network.

In a further advantageous embodiment of the invention, two switch units are connected to the supply network, wherein the network monitoring device can influence the present switching status of the two switch units on the basis of a switch command for one of the switch units in dependence on the determined network utilization of the supply network.

In a further advantageous embodiment of the invention, the supply system comprises a further network monitoring device, which can determine the network utilization at a second measuring point of the supply network. Hence, the further network monitoring device can control the energy supply of the consumers arranged downstream of the second measuring point in a targeted manner via their switch units. The second measuring point on the supply network is a different measuring point from the first measuring point on the supply network and has a different network utilization of the supply network. Preferably, the network monitoring device can also transmit the network utilization at the first measuring point to the further network monitoring device and/or receive the network utilization at the second measuring point from the further network monitoring device so that a more thorough analysis can be performed.

Hence, specific monitoring of different junction points (measuring points) of a supply network is possible. For example, a lower-ranking network monitoring device can also be interpreted as a "switch unit" and hence controlled by the higher-ranking network monitoring device. This provides a possibility of setting up cascaded systems.

The connection of the network monitoring devices to each other and to the switch units switching the consumers can be performed in different ways. The network monitoring device can, for example, be connected to the switch units to be controlled or to a further network monitoring device by way of direct wiring. It is also conceivable for communication between the network monitoring devices and their switch units to take place via a bus system (AS-i, IO-Link, Profibus, etc.). Moreover, it is conceivable for the network monitoring device communication to be performed by way of the modulation of the information on the main circuit (optionally also redundantly on all three phases) of the supply network. Hence, the switch command output by the network monitoring device to the switch unit is modulated on the main circuit of the supply network. The switch unit switching the consumer is able to filter the modulated switch command out of the supply network so that signal transmission can take place between the network monitoring device and the switch unit. Although upstream, but open, switch units would interrupt the communication path, this would not restrict functionality since downstream switch units cannot be connected or do not need to be switched off. Hence, no unwanted increase in network utilization can take place.

If the switch unit comprises a logic unit, the network monitoring device can only transmit a logic signal as a switch command to the switch unit. The evaluation of this logic signal is performed in the actual switch unit. Here, the following scenarios are conceivable for example:

a) the logic unit of the switch unit receives an ON or OFF signal (switch command) from the network monitoring device as a logic signal. In response, the logic unit of the switch unit controls its auxiliary voltage supply so that the consumer is controlled by this.

b) the logic unit of the switch unit receives an encoded signal (for example ON in 5 sec) as a logic signal. This means a decision is made in the network monitoring device and the decision is sent to the switch unit. The switch command is only executed in the switch unit (open control).

In the case of increased network utilization on the supply network, preferably the network monitoring device automatically delays or suppresses the connection of the consumer on the supply network and/or the network monitoring device automatically actuates a further switch unit so that the further switch unit terminates/reduces an energy supply for a consumer taking place via the supply network. A consumer of this kind is preferably a consumer whose availability is not essential.

In an advantageous embodiment, the network monitoring device checks prior to switching of a switch unit whether the implementation of the received switch command on the switch unit on the supply network would result in increased network utilization or not. If the implementation of the received switch command at the switch unit would result in increased network utilization, suitable measures are initiated by the network monitoring device so that there is no increased network utilization on the supply network due to the switch command (for example, ignore switch command, delay switch command, reduce energy consumption of another consumer).

FIG. 1 shows a schematic structure of a supply system with a first and a second network monitoring device 1, 2, wherein the network monitoring devices 1, 2 are connected to switch units 51, 52, 81,82 by way of direct wiring 12. Consequently, the transmission of a switch command from the network monitoring device 1, 2 to a switch unit 51, 52, 81, 82 assigned thereto takes place via the direct wiring 12.

In this example embodiment, four consumers 71, 72, 73, 74 are connected to the supply network 4. The individual consumers 71, 72, 73, 74 each comprise a switch unit 51, 52, 81, 82 by way of which the energy supply to the supply network 4 can be established or suppressed. To this end, the respective switch units 51, 52, 81, 82 close or open the supply line 4 to the relevant consumer 71, 72, 73, 74. Hence, the switch units 51, 52, 81, 82 can connect its associated consumer 71, 72, 73, 74 to the supply network 4 or remove it from the supply network. The switch units 51, 52, 81, 82 are for example soft starters and/or frequency converters. Depending upon the number and type of the connected consumers 71, 72, 73, 74 on the supply network, different network utilizations can occur on the supply network 4.

The consumers 71, 72, 73, 74 are in particular components of an industrial system which require energy from a supply network 4. The consumers 71, 72, 73, 74 are for example lighting systems, air-conditioning systems in factory buildings, stamping machines, production lines or individual electric motors. In order to react to different network utilizations of the supply network 4, the supply system comprises the first network monitoring device 1 and the second network monitoring device 2. The first network monitoring device 1 can determine a network utilization of the supply network 4 at the first measuring point 10 by way of a measurement device 3 at a first measuring point 10 (junction) of the supply network 4. The second network monitoring device 2 can also determine the network utilization of the supply network 4 at a second measuring point 11 by way of a measurement device 3 assigned to it.

The first network monitoring device 1 is hence able to identify whether the supply network 4 has normal network utilization (for example <70% of the permissible maximum network utilization of the supply network) or increased network utilization (for example >70% of the permissible maximum network utilization of the supply network) at the first measuring point 10. The second network monitoring device 2 is also able to identify whether the supply network 4 has normal network utilization (for example <70% of the permissible maximum network utilization of the supply network) or increased network utilization (for example >70% of the permissible maximum network utilization of the supply network) at the second measuring point 11.

To differentiate between normal network utilization and increased network utilization, a reference value stored is stored in the respective network monitoring device 1, 2 so that it can be identified by way of a comparison of the determined network utilization of the supply network 4 with the reference value whether a normal network utilization or increased network utilization exists at the respective measuring point 10, 11 of the supply network 4. This reference value can preferably be set by a user at the network monitoring device 1, 2. This can, for example, be the maximum permissible network utilization of the supply network 4 and a percentage value of this which indicates the time from which normal network utilization is present in the supply network 4 and the time from which increased network utilization is present in the supply network 4. It is also conceivable for several categories to be established with respect to the network utilization so that energy-saving measures can be introduced gradually. It is possible, for example, to define a further network utilization status which indicates critical network utilization (for example >90% of the permissible maximum network utilization of the supply network 4).

In this example embodiment, the network monitoring devices 1, 2 are each connected to a separate control device 6. It is also conceivable for the two network monitoring devices 1, 2 to be connected to only one control device 6. The respective control device 6 can output a switch command for a switch unit 51, 52, 81, 82 to be controlled to its associated network monitoring device 1, 2. Actuation of the corresponding switch unit 51, 52, 81, 82 finally enables its consumers 71, 72, 73, 74 to be controlled.

In the case of the desired actuation of one of the switch units 51, 52, 81, 82, the control device 6 initially outputs a switch command for the corresponding switch unit 51, 52, 81, 82 to the network monitoring device 1, 2. The switch command of the control device 6 is routed via the associated network monitoring device 1, 2 so that the network monitoring device 1, 2 can influence this switch command or not, depending upon the network utilization.

For communication, the respective control device 6 is connected to the network monitoring device 1, 2 by way of direct wiring 12. It is also conceivable for the respective control device 6 to be connected to the network monitoring device 1, 2 for communication by way of a bus connection.

If, for example, the consumer 72 is to be connected to the supply network, the control device 6 outputs a switch command for the switch unit 52 to the network monitoring device 1. In the case of normal network utilization at the network monitoring device 1, the switch command is not influenced. The network monitoring device 1 forwards the received switch command unchanged to the switch unit 52 so that the switching status of the switch unit 52 desired by the control device 6 and finally the desired switching status of the consumer 72 are achieved. On the other hand, in the case of increased network utilization of the supply network 4 at the first measuring point 10, the network monitoring device 1 can exert a targeted influence of the switch command for the switch unit 52 received from its control device 6.

The network monitoring device 1 can in particular reject the received switch command so that no change to the switching status occurs at the switch unit 52 to be switched or there is time delay in the output of the switch command to the switch unit 52 to be switched. In the case of a time delay, the switch unit 52 is preferably only actuated by the network monitoring device when it has been ensured that the implementation of the switch command will not result in increased network utilization. Hence, the consumer 72 is only connected in the case of normal network utilization at the supply network 4. Additionally, the first network monitoring device 1 can, for example, remove a dispensable consumer 71, 73, 74 already connected to the supply network 4 from the supply network 4 by actuating its switch unit 51, 81, 82 so that the network utilization is reduced.

To switch off the consumer 73, 74, a corresponding switch command can be output from the first network monitoring device 1 to the second network monitoring device 2. If, for example, the consumer 73 in the supply system is dispensable (for example, air-conditioning in a factory building), the first network monitoring device 1 can output a signal to the second network monitoring device 2 so that the second network monitoring device actuates the switch unit 81 so that the consumer 73 is removed from supply network. After this, the network utilization drops at the first measuring point 10 so that the consumer 71 to be connected can be connected to the supply network 4 by the actuation of the switch unit 51 by the first network monitoring device without this resulting in increased network utilization.

Consequently, in the case of increased network utilization of the supply network 4, the targeted influence of a received switch command is possible so that a connection of a consumer 71, 72, 73, 74 to the supply network is not implemented or subject to a time delay.

Preferably the following information is exchanged between the control device 6 and the network monitoring device 1, 2:
a) from the control device 6 to the network monitoring device 1, 2:
  switch commands for the corresponding switch units 51, 52, 81, 82.
  maximum network utilization of the supply network 4
  consumption figures for the consumers 71, 72, 73, 74 on start-up and/or during permanent operation.
  priority of the consumer 71, 72, 73, 74 in order, for example, to specify the sequence of disconnection/connection of the consumer 71, 72, 73, 74.
b) from the network monitoring device 1, 2 to the control device 6:
  current network utilization of the supply network 4.
  feedback as to whether the received switch command was implemented or not. In particular, whether the consumer 71, 72, 73, 74 was connected, delayed or not connected by its associated switch unit 51, 52, 81, 82.

The first network monitoring device 1 is also connected to the second network monitoring device by way of a separate line 12. Consequently, the first network monitoring device 1 can communicate with the second network monitoring device 2 via the line 12.

The network monitoring devices 1, 2 each comprise a communication device 9. The communication device 9 enables communication between the network monitoring devices 1, 2 and the associated control device 6 so that a switch command for a switch unit 51, 52, 81, 82 to be controlled can be transmitted by the control device 6 to the network monitoring devices 1, 2. Moreover, the respective communication device 9 enables switch commands to be output to connected switch units 51, 52, 81, 82 by the network monitoring devices 1, 2 so that the consumers 71, 72, 73, 74 controlled via the switch units 51, 52, 81, 82 can be controlled thereby.

Since the first network monitoring device 1 is connected to the second network monitoring device 2, the network utilization at the first measuring point 10 can be transmitted from the first network monitoring device 1 to the second network monitoring device 2. The second network monitoring device 2 also comprises a measurement device 3, by way of which it is able to determine the network utilization of the supply network 4 at a second measuring point 11. The second network monitoring device 2 can also actuate subordinate switch units 81, 82 by way of its communication device 9 such that no overload of the supply network 4 occurs.

The second network monitoring device 2 can actuate the switch unit 81, 82 directly via the line 12 (direct wiring). The logical evaluation of the network utilization and the received switch command for the switch unit 81, 82 takes place in the second network monitoring device 2 so that the switch command received from the control device 6 for one of the switch units 81, 82 can be forwarded to the corresponding switch unit 81, 82 or influenced in a targeted manner.

Since a plurality of switch units 51, 52, 81, 82 are connected to the network monitoring devices 1, 2, flexible reaction is possible with high or critical network utilizations.

The basic principle of the network monitoring device 1, 2 can be applied hierarchically, i.e. a subordinate network monitoring device in the supply network 4 (for example second network monitoring device 2 compared to the first network monitoring device 1) can also be interpreted as a switching device of a consumer. Hence, even relatively large supply networks 4 could be controlled efficiently with this technology.

Figure 2:
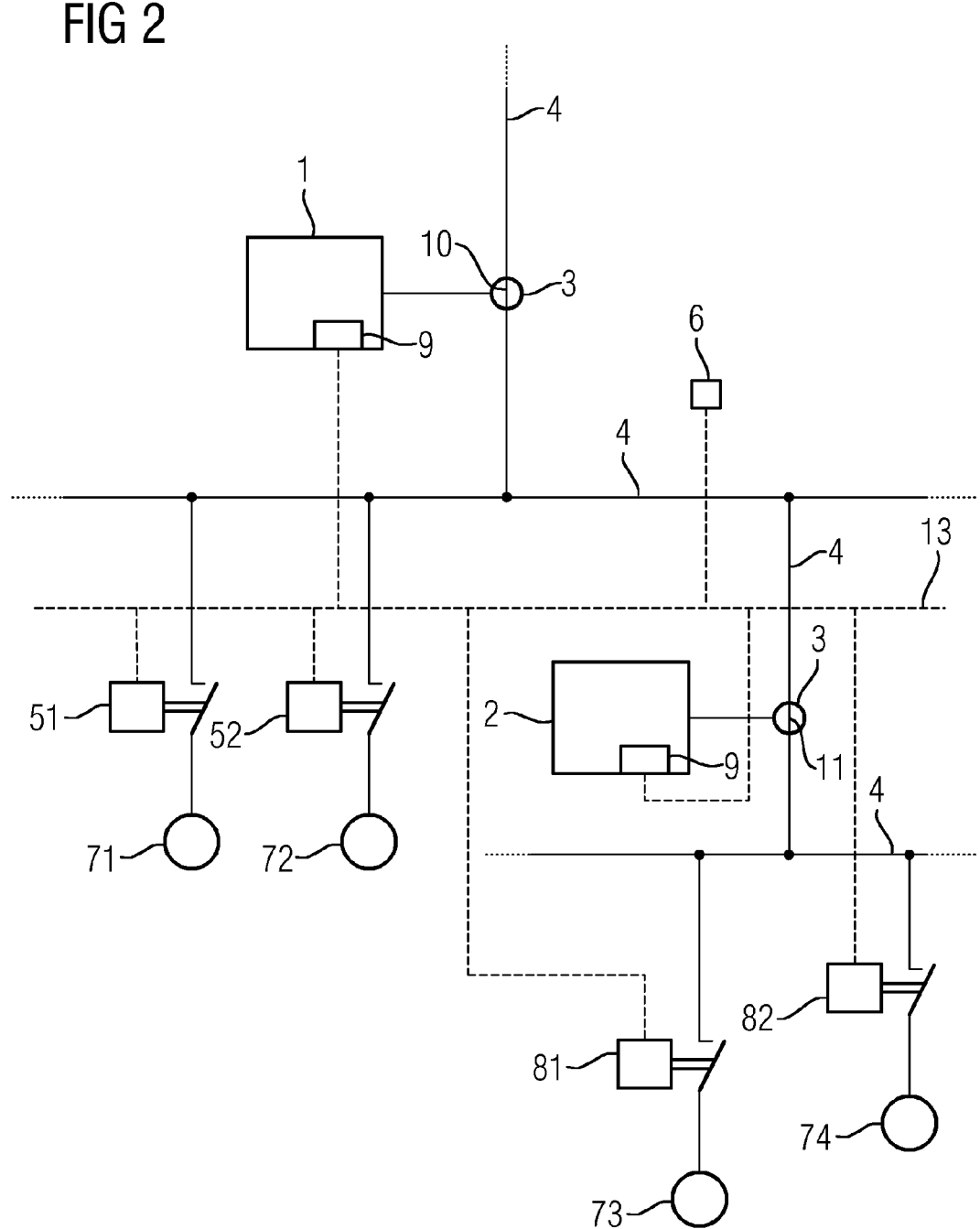
FIG. 2 shows the schematic structure of a supply system with a first and a second network monitoring device, wherein the network monitoring devices are connected to switch units by way of a communication bus.

FIG. 2 shows a schematic structure of a supply system with a first and a second network monitoring device 1, 2, wherein the network monitoring devices 1, 2 are connected to switch units 51, 52, 81, 82 by way of a communication bus 13. The difference from the supply system depicted in FIG. 1 consists in the fact that instead of direct wiring, communication between the network monitoring devices 1, 2 and the associated switch units 51, 52, 81, 82 and the control device 6 is performed by way of a communication bus 13 and that the network monitoring devices 1, 2 are only connected to one control device 6. The control device 6 can output a switch command to the corresponding network monitoring device 1, 2 via the communication bus 13. Profibus, AS-Interface or IO-Link are used as the communication bus 13, for example.

The invention claimed is:

1. A network monitoring device, comprising:
a communication device, wherein
the network monitoring device is configured to receive a switch command for a switch unit via the communication device and is configured to transmit the switch command to the switch unit,
the switch unit is configured to control the energy supply of a consumer connected to a supply network,
the network monitoring device is configured to determine a network utilization of the supply network by way of a measurement device and, in dependence on the determined network utilization, to influence a received switch command for the switch unit which would lead to increased energy consumption on the supply network, and
the switch unit is a contactor, a soft starter or a frequency converter.

2. The network monitoring device of claim 1, wherein the communication device is configured to at least one of control the switch unit directly and transmit the determined network utilization to the switch unit.

3. The network monitoring device of claim 1, wherein the network monitoring device is configured to compare a value determined by the measurement device with a reference value stored in the network monitoring device so that the network utilization of the supply network is determinable.

4. The network monitoring device of claim 1, wherein the network monitoring device is configured such that, when the switch command for the switch unit is present, a further switch unit connected to the network monitoring device is actuatable such that the energy consumption of a consumer actuated by the further switch unit on the supply network will be reduced.

5. The network monitoring device of claim 1, wherein consumption figures for several consumers are stored in the network monitoring device.

6. The network monitoring device of claim 1, wherein the network monitoring device is configured to communicate with a further network monitoring device and is configured to transmit the determined network utilization of the supply network to the further network monitoring device.

7. A programmable logic controller comprising the network monitoring device of claim 1.

8. A supply system comprising:
a supply network;
at least one switch unit; and
the network monitoring device of claim 1, wherein the network monitoring device is configured to determine the network utilization at a first measuring point of the supply network by way of the measurement device and, in dependence on the determined network utilization at the first measuring point, is configured to influence a switch command for the switch unit, which would lead to increased energy consumption on the supply network.

9. The supply system of claim 8, wherein the switch unit is connected downstream in relation to the first measuring point on the supply network.

10. The supply system of claim 8, wherein the switch unit includes two switch units connected to on the supply network, wherein, on the basis of a switch command for one of the two switch units, the network monitoring device is configured to, in dependence on the determined network utilization of the supply network, influence the switching status of the two switch units.

11. The supply system of claim 8, further comprising a further network monitoring device, configured to determine the network utilization at a second measuring point of the supply network.

12. A method for actuating a switch unit, to control energy supply of a consumer connected to a supply network, the method comprising:
determining, using a network monitoring device, a network utilization of the supply network by way of a measurement device and,
influencing, in dependence on the determined network utilization, a received switch command for the switch unit which would lead to increased energy consumption on the supply network, wherein the switch unit is a contactor, a soft starter or a frequency converter.

13. The method as claimed in claim 12, further comprising:
actuating, on the basis of the switch command for the switch unit, a further switch unit connected to the network monitoring device such that the energy consumption of a consumer actuated by the further switch unit on the supply network is reduced.

14. The supply system of claim 9, wherein the switch unit includes two switch units connected to on the supply network, wherein, on the basis of a switch command for one of the two switch units, the network monitoring device is configured to, in dependence on the determined network utilization of the supply network, influence the switching status of the two switch units.

15. A programmable logic controller comprising the network monitoring device of claim 2.

16. A supply system comprising:
a supply network;
at least one switch unit; and
the network monitoring device of claim 2, wherein the network monitoring device is configured to determine the network utilization at a first measuring point of the supply network by way of the measurement device and, in dependence on the determined network utilization at the first measuring point, is configured to influence a switch command for the switch unit, which would lead to increased energy consumption on the supply network.

17. A programmable logic controller comprising the network monitoring device of claim 3.

18. A supply system comprising:
a supply network;
at least one switch unit; and the network monitoring device of claim 3, wherein the network monitoring device is configured to determine the network utilization at a first measuring point of the supply network by way of the measurement device and, in dependence on the determined network utilization at the first measuring point, is configured to influence a switch command for the switch unit, which would lead to increased energy consumption on the supply network.

\* \* \* \* \*